United States Patent [19]

Udagawa et al.

[11] Patent Number: 4,995,624
[45] Date of Patent: Feb. 26, 1991

[54] STEEL LAMINATE GASKET WITH WIDE SEALING AREA

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 439,666

[22] Filed: Nov. 20, 1989

Related U.S. Application Data

[63] Continuation-in-part of Ser. No. 243,528, Sep. 12, 1988, Pat. No. 4,938,488.

[51] Int. Cl.⁵ .............................................. F16J 15/08
[52] U.S. Cl. ................................ 277/235 B; 277/236
[58] Field of Search .................... 277/235 B, 213, 200, 277/236

[56] References Cited

U.S. PATENT DOCUMENTS

| 4,834,399 | 5/1989 | Udagawa et al. | 277/235 B X |
| 4,836,562 | 6/1989 | Yoshino | 277/235 B |
| 4,861,046 | 8/1989 | Udagawa | 277/235 B |

Primary Examiner—William A. Cuchlinski, Jr.
Assistant Examiner—James K. Folker
Attorney, Agent, or Firm—Kanesaka and Takeuchi

[57] ABSTRACT

A steel laminate gasket of the invention is installed in an internal combustion engine having at least one hole therein. The gasket comprises a first plate and a second plate situated under the first plate. The first plate includes at least one first hole corresponding to the hole of the engine, a base portion, at least one curved portion and at least one flange situated above the base portion. The curved portion and flange are integrally formed with the base portion. A side wall is formed on one of the base portion and the flange to form an embossed portion thereat. Also, a bead is formed on the embossed portion to thereby provide a sealing pressure stronger than the embossed portion when the gasket is tightened.

9 Claims, 3 Drawing Sheets 4,995,624

STEEL LAMINATE GASKET WITH WIDE SEALING AREA

CROSS-REFERENCE TO RELATED APPLICATION

This is a continuation in part application of patent application Ser. No. 243,528 filed on Sept. 12, 1988, now U.S. Pat. No. 4,938,488.

BACKGROUND OF THE INVENTION AND RELATED ART STATEMENT

The present invention relates to a steel laminate gasket for an internal combustion engine, which can provide high sealing pressure for a relatively wide range around a hole to securely seal around the hole.

The steel laminate gasket of the present invention may be widely used, such as a regular gasket situated between two engine blocks, cylinder head gasket and manifold gasket. When the gasket of the present invention is used as a cylinder head gasket, the gasket may seal around cylinder holes Hc, water holes Hw, oil holes Ho, bolt holes Hb and the like, as shown in FIG. 1. However, it is preferably to seal around a relatively large hole, such as a cylinder hole Hc.

In a gasket, a main subject of a gasket is to securely seal around a hole. Therefore, when a gasket is designed, attention has been paid to how a portion around a hole is securely sealed. In this respect, there have been proposed many methods.

The conventional method to seal around a hole is to form a bead around a hole, As shown in FIG. 2, for example, a gasket comprises an upper plate 21, a lower plate 23, and a middle plate 22 having a bead 22a around a cylinder hole Hc. In the gasket 20, only the bead 22a provides a sealing pressure around the cylinder hold Hc. Therefore, fluid passing through the hold Hc may permeate through the plates. The sealing ability of the gasket 20 is not good.

In view of the prior art, a gasket 25 as shown in FIG. 3 has been proposed in Ser. No. 193,215 filed on May 11, 1988. The gasket 25 comprises an upper plate 26, with a curved portion 26a and a flange 26b, and a lower plate 27. The gasket 25 can securely seal around the hole Hc. However, since an area around the hold Hc is only sealed by the curved portion 26a, the sealing area that forms sealing pressure is relatively narrow. Further, since the curved portion may strongly abut against the engine blocks, in case the engine blocks are formed of aluminum alloy, the engine blocks may deform at the curved portion. Therefore, a gasket with relatively wide sealing area without affecting the engine blocks has been desired.

Accordingly, one object of the present invention is to provide a steel laminate gasket, which can provide high sealing pressure for a relatively wide range around a hole to be sealed.

Another object of the present invention is to provide a steel laminate gasket as stated above, which does not cause any damage to portions abutting against the gasket.

A further object of the present invention is to provide a steel laminate gasket as stated above, which can be easily and economically manufactured.

Further objects and advantages of the invention will be apparent from the following description of the invention.

SUMMARY OF THE INVENTION

In accordance with the present invention, a steel laminate gasket is designed to be installed in an internal combustion engine having at least one hole therein. The gasket comprises a first plate having at least one first hole corresponding to the hole of the engine, and a second plate situated adjacent to the first plate.

The first plate is provided with a base portion, at least one curved portion extending laterally relative to the base portion to define the first hole, and at least one flange extending parallel to the base portion. The base portion, curved portion and flange are integrally formed together.

The first plate further includes at least one side wall formed on one of the base portion and the flange adjacent the curved portion to surround the first hole, and at least one bead situated between the side wall and the curved portion to extend toward the other of the base portion and the flange. The distance between the flange and base portion inside the side wall is greater than the distance between the flange and base portion outside the side wall.

The second plate is provided with at least one second hole. The diameter of the second hole is larger than the outer diameter of the flange so that when the first and second plates are assembled, the flange is located inside the second hole.

An area around the first hole surrounded by the side wall and the curved portion forms an embossed portion with the first bead. When the gasket is tightened, the embossed portion forms a plurality of corrugated beads to seal around the first hole. Since the embossed portion is provided with the first bead, a strong sealing pressure is formed especially at the first bead.

Namely, the gasket of the invention can provide a moderate sealing pressure at the embossed portion and a strong sealing pressure at the first bead. Therefore, an area around the hole can be sealed properly.

DETAILED DESCRIPTION OF PREFERRED EMBODIMENTS

Figure 1:
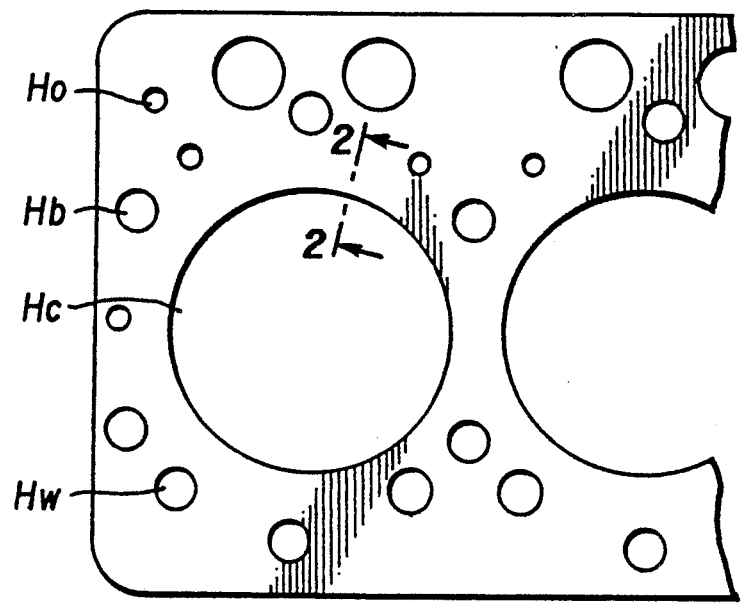
FIG. 1 is a partial plan view of a conventional steel laminate gasket.
Figure 2:
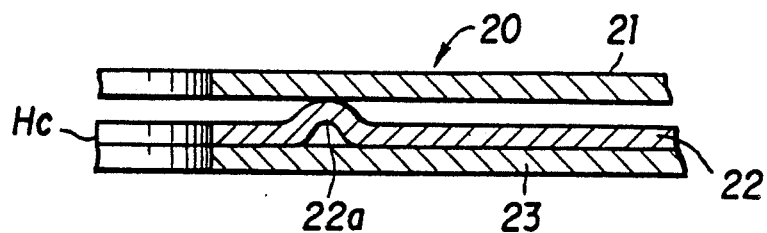
FIG. 2 is an enlarged section view taken along a line 2—2 in FIG. 1.
Figure 3:
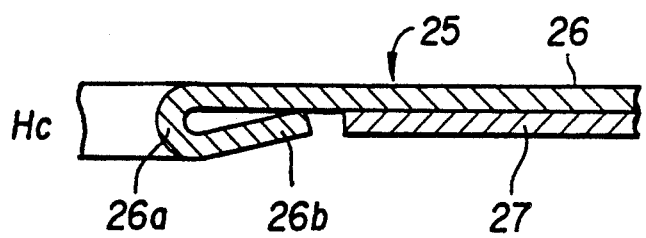
FIG. 3 is a section view, similar to FIG. 2, for showing a related invention.
Figure 4:
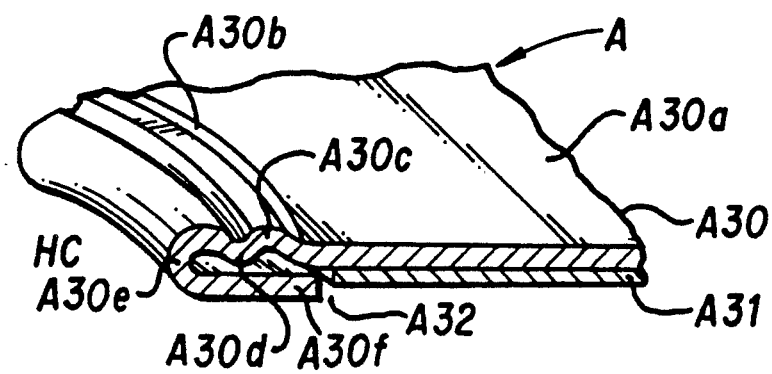
FIG. 4 is a perspective section view of a part of a first embodiment of a steel laminate gasket of the present invention.

Referring to FIG. 4, a first embodiment A of a steel laminate gasket of the present invention is shown. The gasket A as shown in FIG. 4 is a cylinder head gasket, similar to FIG. 1, and is provided with a plurality of holes, i.e. cylinder holes Hc, water holes Hw, oil holes Ho and bolt holes Hb. Areas around the cylinder holes Hc are sealed in accordance with the present invention. However, if required, areas around the water holes Hw, oil holes Ho and bolt holes Hb may be sealed as well.

The gasket A comprises an upper plate A30, and a lower plate A31 situated under the upper plate A30. The upper plate A30 is provided with a base portion A30a extending substantially throughout the entire area of the gasket, a diagonal side wall A30b extending diagonally and upwardly from the base portion A30a around the cylinder hole Hc, and an embossed portion A30c with a bead A30d extending downwardly therefrom. The upper plate A30 also includes a curved portion A30e around the cylinder hole Hc, and a flange A30f situated under the embossed portion A30c.

The flange A30f is spaced apart from the embossed portion A30c, but an end portion of the flange A30f is located under the base portion A30a. The bead A30d contacts the flange A30f.

The lower plate A31 is a flat plate situated under the base portion A30a of the upper plate A30 and is thinner than the upper plate A30. The lower plate A31 is provided with a hole A32. The diameter of the hole A32 is larger than the outer diameter of the flange A30f.

When the gasket A is assembled, the lower plate A31 is situated under the upper plate A30 so that the flange A30f is located in the hole A32. The lower plate A31 does not pile on the flange A30f.

When the gasket A is situated between a cylinder head and a cylinder block (both not shown) and is tightened, the embossed portion A30c and the bead A30d are compressed. As a result, a plurality of corrugated beads are formed on the embossed portion A30c and the bead A30d. The corrugated beads on the bead A30d provide a sealing pressure stronger than those on the embossed portion A30c.

Accordingly, when the gasket A is tightened, a strong sealing pressure formed by the bead A30d is formed in a wide sealing area formed by the embossed portion A30c. A part of the sealing area is only strongly sealed. Therefore, an area around the cylinder hole Hc can be securely sealed. Also, the cylinder head is not damaged by the corrugated beads.

Figure 5:
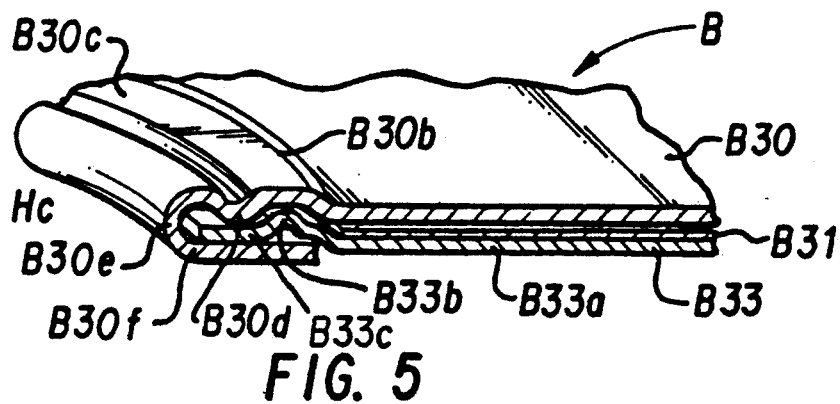
FIGS. 5–7 are perspective section views, similar to FIG. 4, for showing second to fourth embodiments of the gasket of the invention.

FIG. 5 shows a second embodiment B of a steel laminate gasket of the present invention. The gasket B comprises an upper plate B30 with a side wall B30b, embossed portion B30c, bead B30d, curved portion B30e and flange B30f, and a plate B31, similar to the gasket A. However, the gasket B further includes a plate B33 having a main portion B33a situated under the plate B31, a bead B33b situated under the embossed portion B30c between the side wall B30b and the bead B30d, and an end portion B33c situated under the bead B30d.

In the gasket B, the bead B33b is situated under the embossed portion B30c in addition to the bead B30d. Accordingly, when the gasket B is tightened, a strong sealing pressure is formed by the beads B30d, B33b. Since the beads B30d, B33b are spaced apart from each other, the sealing pressure does not concentrate at one portion. Therefore, a strong force to deform a cylinder head is not formed. An area around the cylinder hole Hc is strongly and effectively sealed.

Figure 6:
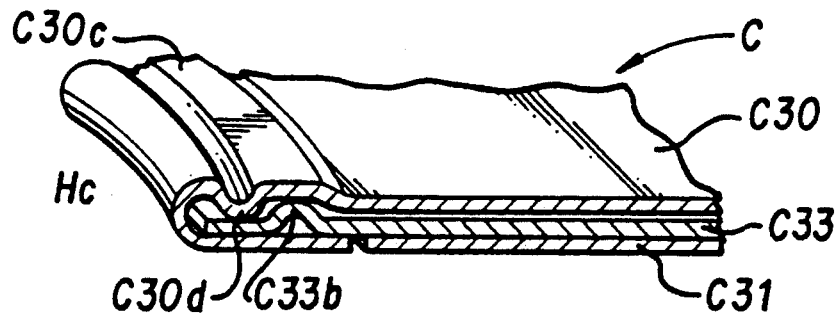

FIG. 6 shows a third embodiment C of a steel laminate gasket of the invention. The gasket C comprises an upper plate C30 with an embossed portion C30c and a bead C30d, a plate C33 with a bead C33b, and a plate C31, similar to the gasket B. The gasket C is different from the gasket B in that the plate C31 is located under the plate C33 though the plate B31 is situated between the plates B33 and B30. The gasket C operates as in the gasket B.

Figure 7:
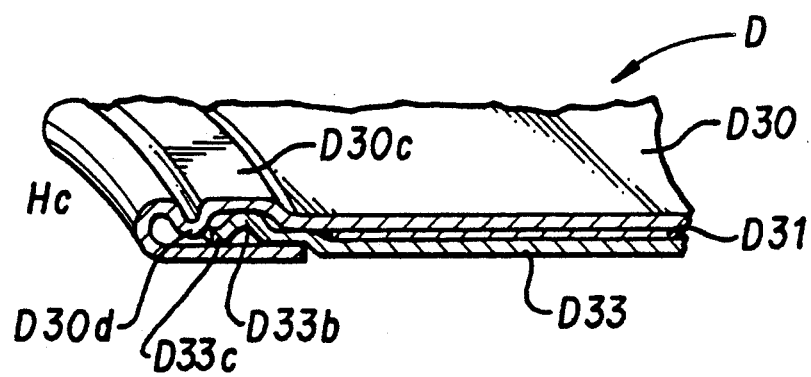

FIG. 7 shows a fourth embodiment D of a steel laminate gasket of the invention. The gasket D comprises an upper plate D30 with an embossed portion D30c and a bead D30d, a plate D33 with a bead D33b and an end portion D33c, and a plate D31, similar to the gasket B. The gasket D is different from the gasket B in that the end portion D33c of the plate D33 does not extend close to the cylinder hole Hc beyond the bead D30d, though in the gasket B, the end portion B33c is located under the bead B30d.

In the gasket D, the end portion D33c of the plate D33 does not extend close to the cylinder hole Hc, so that although the upper plate D30 is exposed to high temperature at a portion adjacent the cylinder hole Hc, the plate D33 is not exposed to high temperature as in the plate D30. Accordingly, the upper plate D30 must be made of a material having high heat resistant property, but the lower plate D33 may be made of a material less heat resistant property than the upper plate D30.

Further, since the plate D33 is not exposed to high temperature, the creep relaxation of the plate D33 is substantially prevented.

Figure 8:
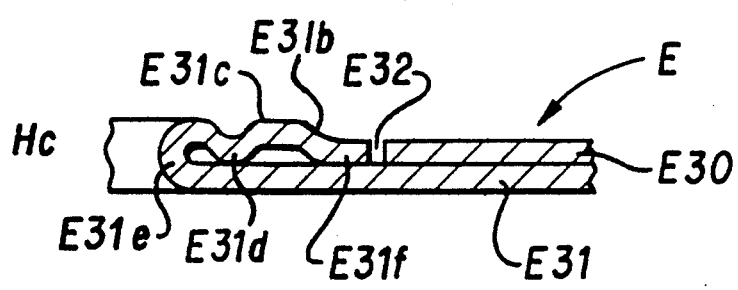
FIG. 8 is a section view of a part of a fifth embodiment of a steel laminate gasket of the invention.

FIG. 8 shows a fifth embodiment E of a steel laminate gasket of the invention. The gasket E comprises an upper plate E30 with a hole E32, and a lower plate E31 situated under the upper plate E30. The lower plate E31 is provided with a curved portion E31e, and a flange E31f wherein a diagonal side wall E31b, embossed portion E31c and a bead E31d are formed. Namely, while the gasket A is provided with the embossed portion A30c on the base portion A30a, in the gasket E, the embossed portion E31c is formed on the flange E31f. The gasket E operates as in the gasket A.

In the present invention, the gasket is provided with a first plate having a relatively wide embossed portion with a bead around a hole to be sealed, and a second plate situated at a flange side of the first plate. When the gasket is tightened, the embossed portion and the bead are compressed to form a plurality of corrugated beads. The corrugated beads at the bead form a sealing pressure stronger than those at the embossed portion. Therefore, an area around the cylinder hole is sealed by moderate sealing pressure formed by the corrugated beads at the embossed portion and high sealing pressure formed by the corrugated beads at the bead.

While the invention has been explained with reference to the specific embodiments of the invention, the explanation is illustratative and the invention is limited only by the appended claims.

What is claimed is:

1. A steel laminate gasket for an internal combustion engine having at least one hole therein, comprising:
a first plate having at least one first hole therein corresponding to the hole of the engine, said first plate including a base portion, at least one curved portion integrally formed with the base portion to extend laterally with respect to the base portion to define the first hole, at least one flange integrally formed with the curved portion and being located at a side of the base portion to extend substantially parallel to the base portion, at least one side wall formed on one of the base portion and the flange adjacent the curved portion to surround the first hole so that the distance between the flange and base portion inside the side wall is greater than the distance between the flange and base portion outside the side wall, and at least one first bead situated between the side wall and the curved portion to extend toward the other of the base portion and the flange, and a second plate situated at a flange side of the first plate, said second plate having at least one second hole therein, the diameter of the second hole being larger than the outer diameter of the flange so that when the first and second plates are assembled, the flange is located inside the second hole.

2. A steel laminate gasket according to claim 1, in which an area around the first hole surrounded by the side wall and the curved portion forms an embossed portion with the first bead, said embossed portion forming a plurality of corrugated beads to seal around the first hole when the gasket is tightened.

3. A steel laminate gasket according to claim 2, in which the width of the embossed portion is shorter than that of the flange so that the periphery of the flange touches the base portion.

4. A steel laminate gasket according to claim 3, in which the embossed portion is formed on the base portion.

5. A steel laminate gasket according to claim 4, further comprising a third plate having a third hole greater than the first hole, a peripheral portion around the third hole, a second bead situated outside the peripheral portion, said second bead being situated between the flange and the base portion of the first plate and extending toward the embossed portion between the side wall and the first bead, and a main area situated outside the second bead.

6. A steel laminate gasket according to claim 5, in which said main area of the third plate is located outside the second plate.

7. A steel laminate gasket according to claim 6, in which said peripheral portion of the third plate is located outside the first bead relative to the first hole.

8. A steel laminate gasket according to claim 5, in which said main area of the third plate is located between the first and second plates.

9. A steel laminate gasket according to claim 3, in which the embossed portion is formed on the flange.

* * * * *